(12) United States Patent
Archie et al.

(10) Patent No.: US 8,855,401 B2
(45) Date of Patent: Oct. 7, 2014

(54) METHODS AND SYSTEMS INVOLVING MEASURING COMPLEX DIMENSIONS OF SILICON DEVICES

(75) Inventors: Charles N. Archie, Granite Springs, NY (US); Anastasios A. Katsetos, Poughkeepsie, NY (US); Eric P. Solecky, Hyde Park, NY (US); Georgios A. Vakas, New Windsor, NY (US)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 12/915,398

(22) Filed: Oct. 29, 2010

(65) Prior Publication Data

US 2012/0106824 A1  May 3, 2012

(51) Int. Cl.
*G06K 9/00* (2006.01)
*G06T 7/00* (2006.01)

(52) U.S. Cl.
CPC ............................... *G06T 7/0006* (2013.01); *G06T 2207/30148* (2013.01)
USPC ............................. 382/145; 382/146; 382/147

(58) Field of Classification Search
None
See application file for complete search history.

(56) References Cited

U.S. PATENT DOCUMENTS

| | | | |
|---|---|---|---|
| 6,642,519 B2 | 11/2003 | Ikeda | |
| 6,995,370 B2 | 2/2006 | Fujita et al. | |
| 7,335,880 B2 | 2/2008 | Langer et al. | |
| 7,468,512 B2 | 12/2008 | Kang et al. | |
| 7,652,249 B2 | 1/2010 | Takane et al. | |
| 7,732,761 B2 | 6/2010 | Tanaka et al. | |
| 2004/0069656 A1* | 4/2004 | Cobb | 205/775 |
| 2007/0092130 A1* | 4/2007 | Shishido et al. | 382/151 |
| 2007/0252993 A1* | 11/2007 | Lim et al. | 356/400 |
| 2008/0073526 A1* | 3/2008 | Takane et al. | 250/307 |
| 2009/0212212 A1 | 8/2009 | Shishido et al. | |
| 2009/0218491 A1 | 9/2009 | Morokuma et al. | |
| 2009/0242760 A1 | 10/2009 | Miyamoto et al. | |

FOREIGN PATENT DOCUMENTS

| | | |
|---|---|---|
| JP | 8022794 A | 1/1996 |
| JP | 8054223 A | 2/1996 |

OTHER PUBLICATIONS

A. Hiraiwa et al., "Discrete Power Spectrum of Line Width Roughness," Journal of Applied Physics, vol. 106, No. 7, pp. 074905 (8 pp.), American Institute of Physics, Oct. 1, 2009.

(Continued)

*Primary Examiner* — Jason M Repko
*Assistant Examiner* — Ryan P Potts
(74) *Attorney, Agent, or Firm* — Cantor Colburn LLP; William Steinberg

(57) ABSTRACT

A method for measuring a dimension of a device includes receiving an image of a portion of the device, receiving a first offset value and a second offset value, processing the image to define a least one graph of a line of pixels, the at least one graph including the brightness level of each pixel in a line of pixels, identifying a location of a first peak and a second peak in the graph, defining a first exclusion area boundary, defining a second exclusion area boundary, setting the brightness level of the pixels between the first exclusion area boundary and the second exclusion area boundary to zero, identifying a first portion of the feature of interest and a second portion of the feature of interest, and measuring a distance between the first portion of the feature of interest and the second portion of the feature of interest.

20 Claims, 5 Drawing Sheets

(56) References Cited

OTHER PUBLICATIONS

F. Gans et al., "Systematic Investigation of CD Metrology Tool Response to Sidewall Profile Variation on a COG Test Mask," EMLC 2006: 22nd European Mask and Lithography Conference, Jan. 23-26, 2006; GMM-Fachbericht: 49, 2006, 117-126.

M. Coles et al., "Automated Method of Detecting SRAF and Sidelobe Printing with Automated CD-SEM Recipes," Proceedings of the SPIE—The International Society for Optical Engineering, vol. 6924, pp. 692430-1-692430-10, Published by SPIE—The International Society for Optical Engineering Mar. 14, 2008; Conference date Feb. 26, 2008.

M. Tanaka et al., "CD-Bias Evaluation and Reduction in DC-SEM Linewidth Measurements," Proceedings of the SPIE—The International Society for Optical Engineering, vol. 6518, pp. 651848 (10 pp.), Published by SPIE—The International Society for Optical Engineering 2007, Conference Date Feb. 26, 2007.

* cited by examiner

METHODS AND SYSTEMS INVOLVING MEASURING COMPLEX DIMENSIONS OF SILICON DEVICES

BACKGROUND

The present invention relates to measuring dimensions of features in silicon devices, and more specifically, to processing images of silicon devices to perform measurements.

Silicon devices are formed using a variety of processing steps that include for example, lithographic imaging and patterning, and material deposition and etching to form device features.

Quality control processes include using an image that may be taken by a scanning electron microscope to determine dimensions of features in the device. In fabrication, for example, an image of a device may be taken and features in the image may be measured to determine whether a feature of the device is formed within design specifications. The imaging and measuring process may be repeated following one or more fabrication steps to ensure that the fabrication steps are being performed correctly.

BRIEF SUMMARY

According to one embodiment of the present invention, a method for measuring a dimension of a device includes receiving an image of a portion of the device, the image including lines of pixels, each pixel having a brightness level, receiving a first offset value associated with the image and a second offset value associated with the image, processing the image to define a least one graph of a line of pixels, the at least one graph including the brightness level of each pixel in a line of pixels, identifying a location of a first peak in the graph, identifying a location of a second peak in the graph, defining a first exclusion area boundary as a function of the location of the first peak in the graph and the first offset value, defining a second exclusion area boundary as a function of the location of the second peak in the graph and the second offset value, setting the brightness level of the pixels between the first exclusion area boundary and the second exclusion area boundary to zero, identifying a first portion of the feature of interest at least partially defined by the first peak and a second portion of the feature of interest at least partially defined by the second peak, measuring a distance between the first portion of the feature of interest and the second portion of the feature of interest, and outputting the measured distance.

According to another embodiment of the present invention, a system for measuring a dimension of a device includes a memory, and a processor operative to receive an image of a portion of the device, the image including lines of pixels, each pixel having a brightness level, receive a first offset value associated with the image and a second offset value associated with the image, process the image to define a least one graph of a line of pixels, the at least one graph including the brightness level of each pixel in a line of pixels, identify a location of a first peak in the graph, identify a location of a second peak in the graph, define a first exclusion area boundary as a function of the location of the first peak in the graph and the first offset value, define a second exclusion area boundary as a function of the location of the second peak in the graph and the second offset value, set the brightness level of the pixels between the first exclusion area boundary and the second exclusion area boundary to zero, identify a first portion of the feature of interest at least partially defined by the first peak and a second portion of the feature of interest at least partially defined by the second peak, measure a distance between the first portion of the feature of interest and the second portion of the feature of interest, and output the measured distance.

According to yet another embodiment of the present invention, a computer readable medium including instructions for receiving an image of a portion of the device, the image including lines of pixels, each pixel having a brightness level, receiving a first offset value associated with the image and a second offset value associated with the image, processing the image to define a least one graph of a line of pixels, the at least one graph including the brightness level of each pixel in a line of pixels, identifying a location of a first peak in the graph, identifying a location of a second peak in the graph, defining a first exclusion area boundary as a function of the location of the first peak in the graph and the first offset value, defining a second exclusion area boundary as a function of the location of the second peak in the graph and the second offset value, setting the brightness level of the pixels between the first exclusion area boundary and the second exclusion area boundary to zero, identifying a first portion of the feature of interest at least partially defined by the first peak and a second portion of the feature of interest at least partially defined by the second peak, measuring a distance between the first portion of the feature of interest and the second portion of the feature of interest, and outputting the measured distance.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
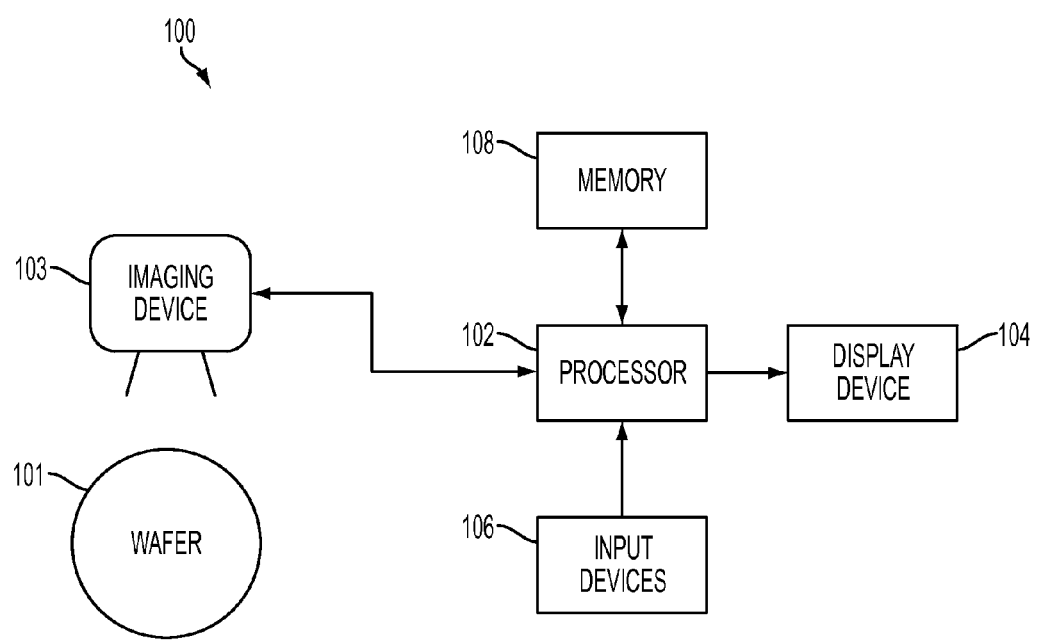
FIG. 1 illustrates an exemplary embodiment of a system.

FIG. 1 illustrates an exemplary embodiment of a system 100. The system 100 includes a processor 102 communicatively connected to an imaging device 103, a display device 104, input devices 106, and memory 108. The imaging device 103 may include, for example, a scanning electron microscope (SEM) that is operative to take images of portions of a silicon device in fabrication that may be formed on a wafer 101 or other substrate medium.

In fabrication, silicon devices may be formed using a number of processing steps. For example, a field effect transistor device and associated connections may be formed by a series of lithographic patterning and masking process, material deposition processes, and material etching processes. Throughout the series of processes, it is desirable to measure the features formed in the device to determine whether the formed features meet design specifications. These measurements may be performed by taking an image of a feature using a SEM and measuring points of the feature shown in the image to determine the dimensions of the feature. Each measurement generally includes taking an image of a portion of a device, identifying the features of interest in the image by using a reference image, and measuring a dimension of the identified features using the taken image. Typically, a digitized SEM image is used having a plurality of pixels. One method for performing the measurement is to use an algorithm to identify features in the image using grayscale values of the pixels. Once the features have been identified, they may be measured using the image. It is often desirable to perform measurements following each (or several) fabrication step to ensure quality control. In many instances, an image may include features that have been formed in a previous fabrication step that are not features of interest to be measured (or have been previously measured in fabrication). These features may interfere with the identification and measurement of features of interest. The methods and systems described below allow undesirable features in an image to be effectively removed from a processed image, which allows feature identification and measurement algorithms to easily identify and measure features of interest in an image.

Figure 3:
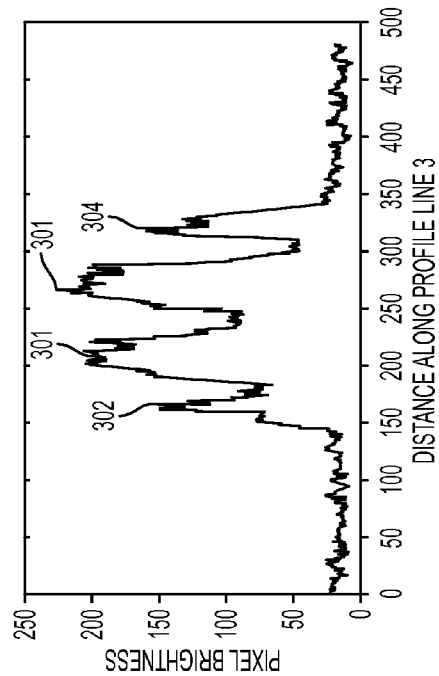
FIG. 3 includes a graph illustrating pixel brightness levels by pixel position along the profile line 3 of FIG. 2.
Figure 2:
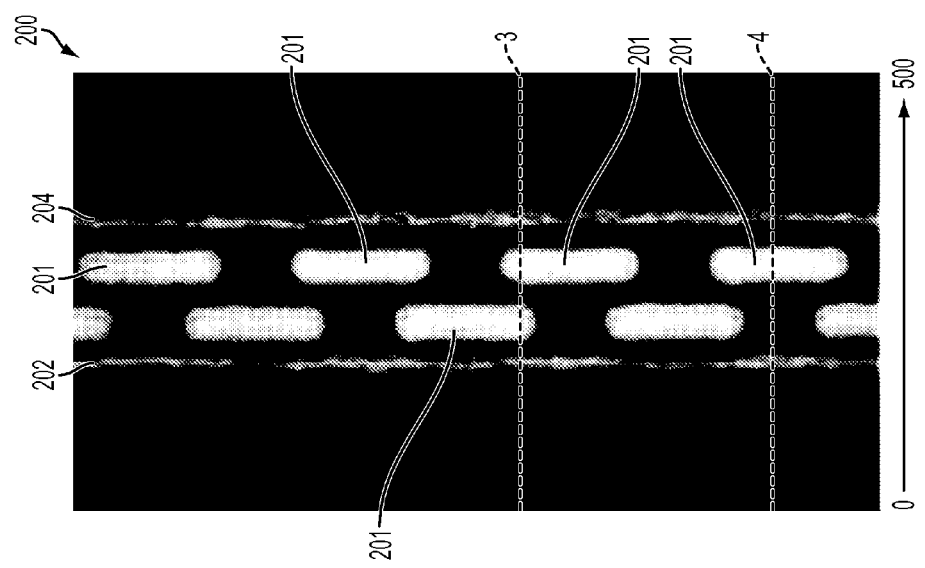
FIG. 2 illustrates an example of an image.

FIG. 2 illustrates an example of an image 200 that has been taken by an imaging device 103 (of FIG. 1). In the illustrated example, it is desirable to measure the distance between the vertical lines 202 and 204 (conductive lines). FIG. 3 includes a graph illustrating pixel brightness levels by pixel position along the profile line 3 of FIG. 2; while FIG. 4 includes a similar graph along the profile line 4 of FIG. 2. In this regard, the horizontal axis of FIG. 3 represents a pixel position along the line 3 (0-500; where 0 is the leftmost position and 500 is the rightmost position) (of FIG. 2) and the vertical axis of FIG. 3 represents a pixel brightness level of the pixels, where lighter or brighter pixels have a greater value than darker pixels. By analyzing a plurality of graphs representing a plurality of horizontal scans, the approximate position of the lines 202 and 204 may be determined by identifying the location of the peaks in each of the graphs.

Referring to FIG. 2, though it is desirable to measure the distance between the features shown by the vertical lines 202 and 204, other features in the image, for example, the features 201 (silicon on insulator (SOI) regions formed in previous fabrication steps) result in image pixels with high brightness levels that may interfere with the measurement of the dimension between the lines 202 and 204. Referring to FIG. 3, the peak 302 represents the pixels in the vertical line 202 (along the line 3 of FIG. 2) while the peak 304 represents the pixels in the vertical line 204 (along the line 3 of FIG. 2). The peaks 301 correspond to the features 201 (along the line 3 of FIG. 2). Similarly, referring to FIG. 4, the peak 402 represents the pixels in the vertical line 202 (along the line 4 of FIG. 2); the peak 404 represents the pixels in the vertical line 204; and the peak 401 represents the pixels in the feature 201.

Figure 4:
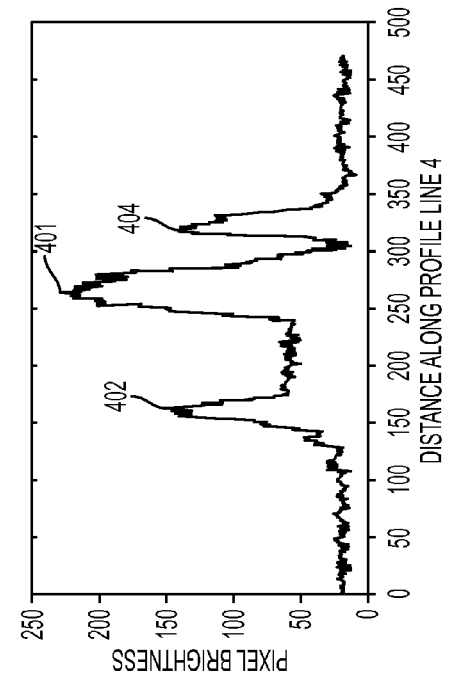
FIG. 4 includes a graph illustrating pixel brightness levels by pixel position along the profile line 4 of FIG. 2.

Referencing FIG. 4, a logical algorithm may be used to locate the peaks in the graph. In this regard, the algorithm may run from left to right along the horizontal axis to find the highest peak (a similar algorithm may be run from right to left). In the illustrated example, the highest peak from left to right would be the peak 401, which is not a feature of interest. While the portions of the feature of interest, the vertical lines 202 and 204 represented in FIG. 4 by the peaks 402 and 404 respectively, may not be identified by the measurement algorithm.

Figure 6:
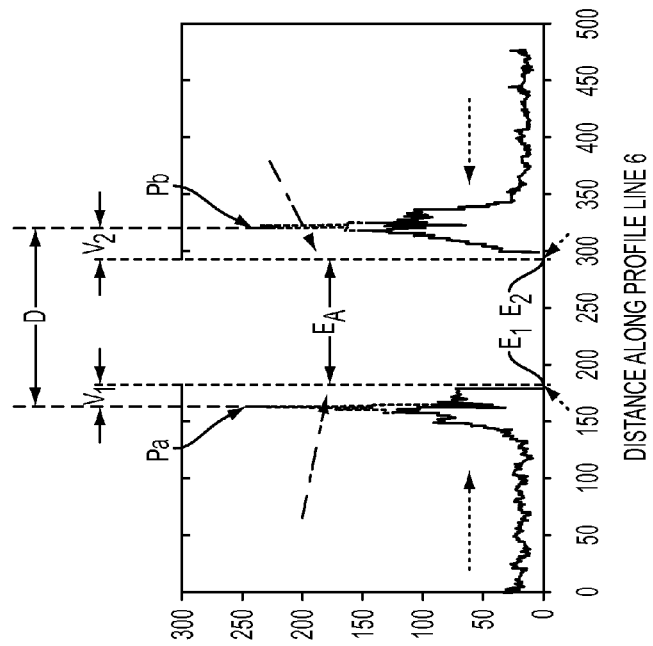
FIG. 6 includes a graph illustrating pixel brightness levels by pixel position along the profile line 6 of FIG. 5.
Figure 5:
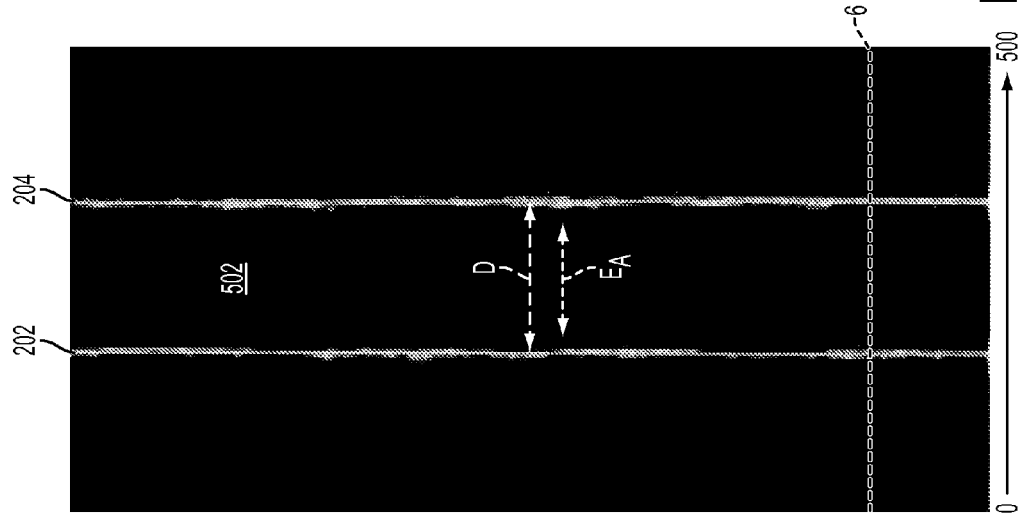
FIG. 5 illustrates an example of another image.

FIGS. 5 and 6 illustrate the image 200 and a corresponding graph (FIG. 6) that represents the pixel brightness levels along the line 6 (of FIG. 5) with an exclusion area 502 disposed between the vertical lines 202 and 204 that has been identified by a user. In operation, such an image may be used as a reference image for subsequent testing and measuring operations. Thus, each measurement cycle may correspond to one or more fabrication steps and use a reference image that may include an identified exclusion area. The reference image may be used to automatically identify the features of interest that may then be automatically measured from the image. The exclusion area 502 may be defined by the user using a graphical user interface that graphically defines the exclusion area 502. Alternatively, a user may enter the coordinates of the exclusion area 502 numerically.

Referring to FIG. 6, the exclusion area ($E_A$) 502 (of FIG. 5) is defined in FIG. 6 as the region between points $E_1$ and $E_2$ on the horizontal axis. The points $E_1$ and $E_2$ are defined by the peaks $P_a$ and $P_b$ and offset values $V_1$ and $V_2$ respectively where the offset values may be defined by the user. Thus, $E_a = P_a + V_1$ and $E_b = P_b - V_2$. In operation, the pixel brightness values in the exclusion area 502 are set to zero (0) as shown in FIGS. 5 and 6. In an exemplary operation, once the exclusion area is applied to the graph, a first algorithm that runs from left to right will correctly identify the peak $P_a$ as representing the location of the vertical line 202 (a feature of interest) (of FIG. 5) while a second algorithm that runs from right to left will correctly identify the peak $P_b$ as representing the vertical line 204 (a feature of interest) (of FIG. 5). Any peaks that were in the exclusion area $E_A$ will not be identified by the algorithms since the peaks have been removed by setting the pixel brightness levels of the pixels in $E_A$ to 0. Once the peaks have been identified, the distance (D) between the vertical lines 202 and 204 may be calculated (i.e., measured) by the tool's measurement algorithm which is approximately $D = P_a - P_b$.

The exclusion area may be used in each horizontal scan of the image 200. For example, referring to FIG. 3, the peak 302 corresponds to $P_a$ and the peak 304 corresponds to $P_b$. Applying $V_1$ and $V_2$ to $P_a$ and $P_b$ defines $E_A$ (which would exclude the peaks 301 from the peak identifying algorithms). Even though the $P_a$ and $P_b$ locations in FIGS. 3 and 6 may be in slightly different locations on the horizontal axes, the same offset values $V_1$ and $V_2$ values may be used in each graph to define $E_A$.

A plurality of graphs ($G_0 \ldots G_{n-1}$) may be used to define the location of the features of interest. In this regard, processing each graph ($G_n$) provides a plurality of points [$P_{a0}, P_{a1}, \ldots, P_{an-1}$] and [$P_{b0}, P_{b1}, \ldots, P_{bn-1}$]. An algorithm function may be applied to the plurality of points to define fit line locations on the horizontal axis (a first fit location ($P_{aF}$) and a second fit location ($P_{bF}$)). The distance (D) between the defined features is measured where $D = P_{2F} - P_{1F}$.

Figure 7:
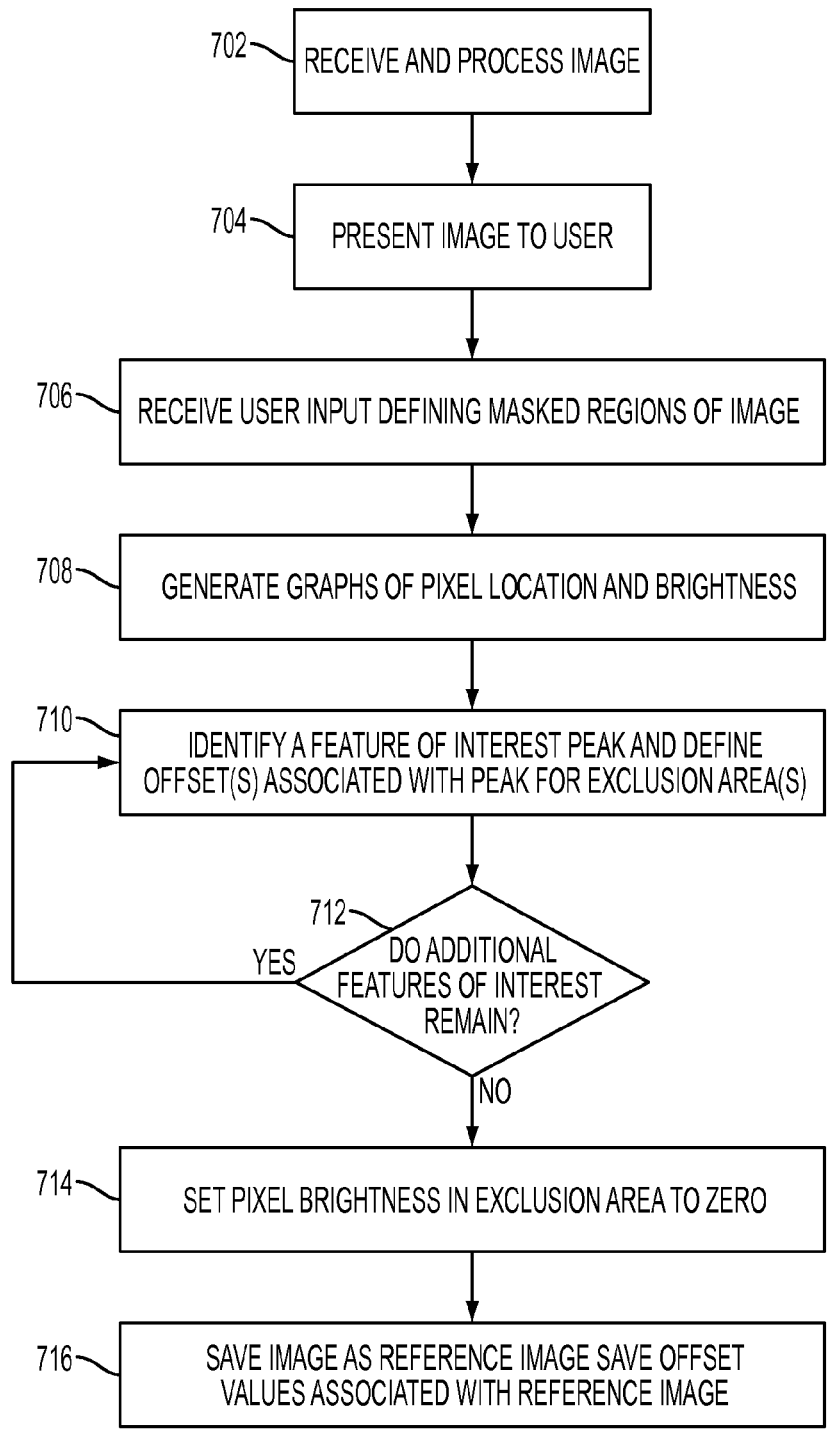
FIG. 7 illustrates a block diagram of an exemplary method for defining an exclusion area in an image.

FIG. 7 illustrates a block diagram of an exemplary method for defining an exclusion area in an image. The exemplary method may be performed by a user using the system 100 (of FIG. 1) described above. The exemplary method may be performed in a pre-fabrication process to define exclusion areas in a reference image. The reference image may then be used when processing subsequent images taken during the fabrication of a silicon device for measurement of features of interest. In this regard, in block 702, an image is received and processed. Processing may include, for example, locating a pattern recognition location on a wafer, focusing the image, identifying a measurement location, defining a measurement scanning area, and image alignment. The processed image is presented to a user in block 704. In block 706, a user inputs the masked or exclusion areas of the image. The user may use, for example, a graphical user interface to graphically identify, or "draw" and exclusion area, or enter coordinates of the exclusion area numerically. Graphs representing pixel locations and brightness are generated in block 708. In block 710, features of interest are identified by peaks in the graphs, and the offsets ($V_n$) defined by the exclusion area are associated with the peaks. If no additional features of interest remain in block 712, the brightness of the pixels in the exclusion area is set to zero (0). In block 716, the image is saved in memory along with the offset values associated with the exclusion area that are associated with the image.

Figure 8:
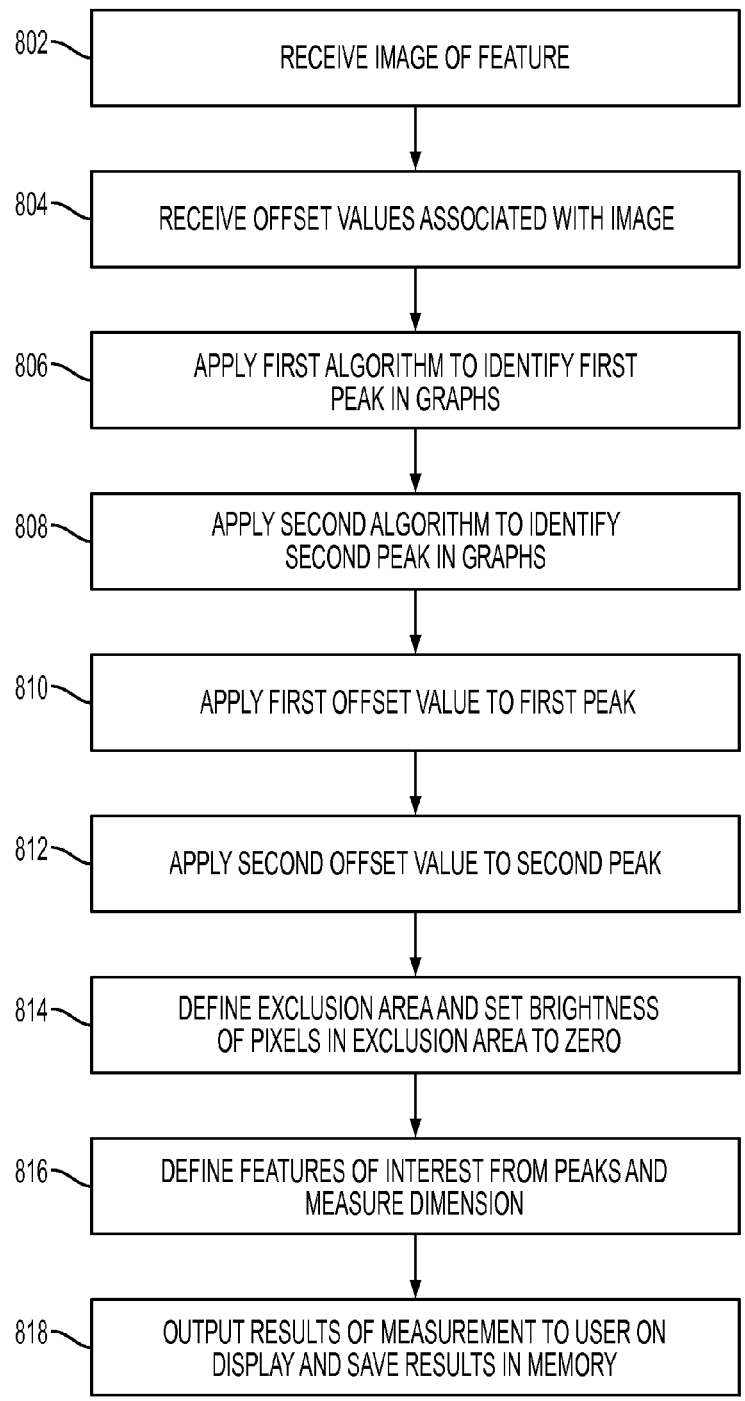
FIG. 8 illustrates a block diagram of an exemplary method for measuring a dimension of a feature of interest in a silicon device fabrication process.

FIG. 8 illustrates a block diagram of an exemplary method for measuring a dimension of a feature of interest in a silicon device fabrication process. In block 802, an image of a feature in a silicon wafer is received. The image is taken by an imaging device that has been indexed and aligned to render an image of the feature of interest. In block 804, offset values ($V_1$ and $V_2$) are received that are associated with the image. The offset values are received from memory or a database that has stored the range values for a particular measurement of an image and will be used to define the exclusion area of the image. In block 806, a plurality of graphs similar to the graphs in FIGS. 3, 4, and 6 may be generated and a first algorithm is applied to identify a first peak in the graphs. The first algorithm may scan the graph from either left to right or right to left. For illustrative purposes the first algorithm scans from left to right to identify a location of the first peak ($P_a$) on the horizontal axes. In block 808, a second algorithm scans from right to left to identify a second peak ($P_b$) on the horizontal axes in the graphs. In block 810, a first offset value ($V_a$) is applied to the first peak location. In block 812, a second offset value ($V_b$) is applied to the second peak. In block 814, the exclusion area ($E_A$) boundary is defined by the offset values where the $E_A$ includes the pixels between the boundary points [$P_a+V_1$] and [$P_b-V_2$]. The brightness of the pixels in the exclusion area are set to zero. In block 816, the location of the features of interest are defined by the points $P_a$ and $P_b$ and measured where to define the distance D where $D=P_b-P_a$. The results of the measurement may be output to be presented to a user on a display and/or saved in memory in block 818.

In fabrication of a silicon device, the measurement may be used in quality control to determine whether the fabrication methods have formed a feature that satisfies design specifications.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for measuring a dimension of a device, the method including:
   receiving an image of a portion of the device, the image including lines of pixels, each pixel having a brightness level;
   receiving a first offset value associated with the image and a second offset value associated with the image;
   processing the image to define at least one graph of a line of pixels, the at least one graph including the brightness level of each pixel in a line of pixels;
   identifying a location of a first peak in the graph by scanning the at least one graph in a first direction;
   identifying a location of a second peak in the graph by scanning the at least one graph in a second direction opposite the first direction;
   defining a first exclusion area boundary as a function of the location of the first peak in the graph and the first offset value;
   defining a second exclusion area boundary as a function of the location of the second peak in the graph and the second offset value;
   setting the brightness level of the pixels between the first exclusion area boundary and the second exclusion area boundary to zero, so as to modify the image by creating a darkened exclusion area located between the first exclusion area boundary and the second exclusion area boundary;
   identifying a first portion of a feature of interest at least partially defined by the first peak and a second portion of the feature of interest at least partially defined by the second peak;
   finding a third peak in the graph, which is the highest peak in the graph, and is not the feature of interest;
   measuring a distance between the first portion of the feature of interest and the second portion of the feature of interest; and
   outputting the measured distance.

2. The method of claim 1, wherein the first exclusion area boundary is defined by adding the first offset value to the location of the first peak.

3. The method of claim 1, wherein the second exclusion area boundary is defined by subtracting the second offset value from the location for the second peak to define a second exclusion area boundary.

4. The method of claim 1, where the method further includes:
   processing the image to define a second graph of a line of pixels, the second graph including the brightness level of each pixel in a second line of pixels;
   identifying a location of a first peak in the second graph;
   identifying a location of a second peak in the second graph;
   adding the first offset value to the location of the first peak in the second graph to define a first exclusion area boundary in the second graph;
   subtracting the second offset value from the location for the second peak in the second graph to define a second exclusion area boundary in the second graph;
   setting the brightness level of the pixels between the first exclusion area boundary in the second graph and the second exclusion area boundary in the second graph to zero; and
   further defining the first portion of the feature of interest as a function of at least the first peak and the first peak in the second graph, and further defining the second portion of the feature of interest as a function of at least the second peak and the second peak in the second graph.

5. The method of claim 1, wherein the at least one graph includes:
   a horizontal axis representing a location of each pixel in the line of pixels; and
   a vertical axis representing the brightness level of each pixel in the line of pixels.

6. The method of claim 1, wherein the first offset value and the second offset value are defined by a user by identifying masked regions of a master image, the master image is similar to the received image.

7. The method of claim 1, wherein the measured distance is output to a memory and saved in the memory.

8. The method of claim 1, wherein the measured distance is output to a display and presented to a user on the display.

9. A system for measuring a dimension of a device, the system including:
a memory; and
a processor operative to
receive an image of a portion of the device, the image including lines of pixels, each pixel having a brightness level,
receive a first offset value associated with the image and a second offset value associated with the image,
process the image to define at least one graph of a line of pixels, the at least one graph including the brightness level of each pixel in a line of pixels,
identify a location of a first peak in the graph by scanning the at least one graph in a first direction,
identify a location of a second peak in the graph by scanning the at least one graph in a second direction opposite the first direction,
define a first exclusion area boundary as a function of the location of the first peak in the graph and the first offset value,
define a second exclusion area boundary as a function of the location of the second peak in the graph and the second offset value,
set the brightness level of the pixels between the first exclusion area boundary and the second exclusion area boundary to zero, so as to modify the image by creating a darkened exclusion area located between the first exclusion area boundary and the second exclusion area boundary,
identify a first portion of a feature of interest at least partially defined by the first peak and a second portion of the feature of interest at least partially defined by the second peak,
find a third peak in the graph, which is the highest peak in the graph, and is not the feature of interest;
measure a distance between the first portion of the feature of interest and the second portion of the feature of interest, and
output the measured distance.

10. The system of claim 9, wherein the first exclusion area boundary is defined by adding the first offset value to the location of the first peak.

11. The system of claim 9, wherein the second exclusion area boundary is defined by subtracting the second offset value from the location for the second peak to define a second exclusion area boundary.

12. The system of claim 9, wherein the processor is further operative to process the image to define a second graph of a line of pixels, the second graph including the brightness level of each pixel in a second line of pixels, identify a location of a first peak in the second graph, identify a location of a second peak in the second graph, add the first offset value to the location of the first peak in the second graph to define a first exclusion area boundary in the second graph, subtracting the second offset value from the location for the second peak in the second graph to define a second exclusion area boundary in the second graph, set the brightness level of the pixels between the first exclusion area boundary in the second graph and the second exclusion area boundary in the second graph to zero; and further defining the first portion of the feature of interest as a function of at least the first peak and the first peak in the second graph, and further defining the second portion of the feature of interest as a function of at least the second peak and the second peak in the second graph.

13. The system of claim 9, wherein the at least one graph includes:
a horizontal axis representing a location of each pixel in the line of pixels; and
a vertical axis representing the brightness level of each pixel in the line of pixels.

14. The system of claim 9, wherein the first offset value and the second offset value are defined by a user by identifying masked regions of a master image, the master image is similar to the received image.

15. The system of claim 9, wherein the measured distance is output to the memory and saved in the memory.

16. The system of claim 9, wherein further includes a display and the measured distance is output to the display and presented to a user on the display.

17. A non-transitory computer readable medium including instructions for implementing a method for measuring a dimension of a device, the method including:
receiving an image of a portion of the device, the image including lines of pixels, each pixel having a brightness level;
receiving a first offset value associated with the image and a second offset value associated with the image;
processing the image to define at least one graph of a line of pixels, the at least one graph including the brightness level of each pixel in a line of pixels;
identifying a location of a first peak in the graph by scanning the at least one graph in a first direction;
identifying a location of a second peak in the graph by scanning the at least one graph in a second direction opposite the first direction;
defining a first exclusion area boundary as a function of the location of the first peak in the graph and the first offset value;
defining a second exclusion area boundary as a function of the location of the second peak in the graph and the second offset value;
setting the brightness level of the pixels between the first exclusion area boundary and the second exclusion area boundary to zero, so as to modify the image by creating a darkened exclusion area located between the first exclusion area boundary and the second exclusion area boundary;
identifying a first portion of a feature of interest at least partially defined by the first peak and a second portion of the feature of interest at least partially defined by the second peak;
finding a third peak in the graph, which is the highest peak in the graph, and is not the feature of interest;
measuring a distance between the first portion of the feature of interest and the second portion of the feature of interest; and
outputting the measured distance.

18. The computer readable medium of claim 17, where the instructions further include:
processing the image to define a second graph of a line of pixels, the second graph including the brightness level of each pixel in a second line of pixels;
identifying a location of a first peak in the second graph;
identifying a location of a second peak in the second graph;

adding the first offset value to the location of the first peak in the second graph to define a first exclusion area boundary in the second graph;

subtracting the second offset value from the location for the second peak in the second graph to define a second exclusion area boundary in the second graph;

setting the brightness level of the pixels between the first exclusion area boundary in the second graph and the second exclusion area boundary in the second graph to zero; and further defining the first portion of the feature of interest as a function of at least the first peak and the first peak in the second graph, and further defining the second portion of the feature of interest as a function of at least the second peak and the second peak in the second graph.

19. The computer readable medium of claim 17, wherein the at least one graph includes:

a horizontal axis representing a location of each pixel in the line of pixels; and a vertical axis representing the brightness level of each pixel in the line of pixels.

20. The computer readable medium of claim 17, wherein the first offset value and the second offset value are defined by a user by identifying masked regions of a master image, the master image is similar to the received image.

* * * * *